(12) United States Patent
Stepanek

(10) Patent No.: US 6,414,761 B1
(45) Date of Patent: *Jul. 2, 2002

(54) SECURE HOLOGRAPHIC IMAGES ON PAPER

(75) Inventor: Michael J. Stepanek, Hollis, NH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/687,272

(22) Filed: Oct. 13, 2000

Related U.S. Application Data

(60) Provisional application No. 60/187,083, filed on Mar. 6, 2000.

(51) Int. Cl.⁷ .................................................. G03H 1/00
(52) U.S. Cl. .......................... 359/2; 359/3; 359/22; 359/24; 283/85; 283/66
(58) Field of Search ........................ 359/2, 3, 22, 24; 283/85, 86

(56) References Cited

U.S. PATENT DOCUMENTS

| | | | |
|---|---|---|---|
| 4,140,373 A | * 2/1979 | Rull | 380/54 |
| 4,400,616 A | 8/1983 | Chevillat et al. | 235/487 |
| 4,568,141 A | 2/1986 | Antes | 350/3.61 |
| 5,499,116 A | * 3/1996 | Wreede et al. | 359/2 |
| 5,662,986 A | 9/1997 | Stepanek | 428/195 |
| 5,723,203 A | 3/1998 | Stepanek | |
| 5,735,989 A | 4/1998 | Stepanek | 156/237 |
| 5,746,865 A | 5/1998 | Stepanek | |
| 5,766,734 A | 6/1998 | Stepanek | 428/195 |
| 5,825,475 A | 10/1998 | Formosa | 356/71 |
| 5,871,608 A | 2/1999 | Stepanek | |
| 5,900,095 A | 5/1999 | Stepanek | 156/230 |
| 5,902,436 A | 5/1999 | Stepanek | |
| 5,939,177 A | 8/1999 | Stepanek | |
| 5,999,280 A | 12/1999 | Huang | 359/2 |
| 6,280,891 B2 | 8/2001 | Daniel et al. | 430/10 |

FOREIGN PATENT DOCUMENTS

| | | |
|---|---|---|
| CA | 2046711 | 1/1992 |
| JP | 4-179592 | 6/1992 |
| JP | 6-118864 | 4/1994 |

* cited by examiner

Primary Examiner—Cassandra Spyrou
Assistant Examiner—Leo Boutsikaris
(74) Attorney, Agent, or Firm—Lisa M. Soltis; Mark W. Croll; Donald J. Breh

(57) ABSTRACT

A paper support has an adhesive layer and a metallized holographic image, wherein the metallized holographic image includes at least two holograms, such that the first hologram is visible only by non-coherent light and the second hologram is visible only by coherent light. The holographic images are formed on a photosensitive element on a polymeric support by imaging steps, which include metallizing the holographic images and overcoating the holographic images with an adhesive layer. Next, the metallized holographic images are transferred to the paper by laminating the adhesive layer to the paper at a predetermined temperature and pressure, and subsequently delaminating the polymeric support from the paper, such that the holographic image remains on the polymer support for reuse.

9 Claims, 3 Drawing Sheets

SECURE HOLOGRAPHIC IMAGES ON PAPER

CROSS-REFERENCE TO RELATED APPLICATION

This application is related to application Ser. No. 09/686,501 filed on Oct. 11, 2000 and Ser. No. 09/687,553 filed on Oct. 13, 2000.

This application claims priority from Provisional application Ser. No. 60/187,033, filed Mar. 6, 2000.

BACKGROUND OF THE INVENTION

1. Field of the Invention

This invention relates to special holographic images that are formed so as to provide security when viewed under special conditions and more specifically to a process for making multiple transference of these images on to paper.

2. Description of the Prior Art

Holographically enhanced materials are well known in the prior art and they have been fully described in my previously filed and issued patents described above. These materials include a number that have been used to enhance products with which they are associated such as wrapping papers, papers, cardboard boxes and the like. Also, holographically enhanced images can be used on credit cards and the like in order to provide security since the image is difficult to reproduce. Preparation of the holographic image is a well-known process but has not been widely used until the discovery of my unique processes for multiple transference of a metallized image onto alternative supports. A special novel support is a paper support, which heretofore could not be enhanced with a holographic image, because the support was too fragile. This element and process is well described in the aforementioned related patents above. The preparation of holographic materials is also described fully, among other references, in the *Holography Handbook*, Unterseher et al., $2^{nd}$ Edition (1996), Ross Books, Berkeley, Calif.

Typical security holographic materials are exemplified in U.S. Pat. No. 3,894,756. Here a coded hologram is placed within an element such as a security ID card, for example. In order to unscramble the coded hologram a complicated beam-unscrambling device must be employed. When the beam is shown on to the coded hologram the image is formed and can be viewed. Another security system is described in U.S. Pat. No. 4,140,373. In this reference overlapping holograms are applied to the desired layer, one of said overlapping hologram being visible only by coherent light (e.g. laser light). When this coherent light is applied, the so-called invisible hologram can be seen. U.S. Pat. No. 4,400,616 describes yet another security system in which an identification card can be made, for example, by laminating one or more planar transparent wave-guide holograms to a support. By placing a grating over the resulting product, said grating being receptive to a particular wavelength, the desired image can be illuminated. Another reference, which describes a system and method for identifying a coded hologram, is U.S. Pat. No. 5,825,475. In this particular invention, a hologram is recorded on a substrate using a particular wavelength of light. By illuminating the hologram with that particular wavelength of light, the image can be viewed.

As can be seen from perusing these many prior art references, the making, manufacturing and selling of products that contain so-called hidden holograms is a complicated process involving a large number of steps and complicated equipment and viewing apparatus. Each element must be manufactured separately and thus it is a costly process.

Recently a newer and improved system for manufacturing the so-called hidden holograms has been found. In this system, a photosensitive resist layer is used. Part of the photosensitive layer is masked and a first hologram (white light—non-coherent—viewable) imaged on the un-masked area. The mask is then removed and another hologram (laser light—coherent—viewable) imaged on the unexposed area. Since there are now two holograms applied to this layer, one cannot be viewed directly by standard illumination methods and must be illuminated by reflecting coherent light (e.g. a laser) at a 90° angle on to a viewing surface (e.g. a white reflective surface such as white paper, for example). Although this unique and useful system can produce security-type hidden holograms there are no methods for commercialization of the process so that it can be used extensively throughout the commercial industry.

SUMMARY OF THE INVENTION

There is a pressing need to make, manufacture and sell materials, which contain hidden holograms in order to prevent fraud. For example, counterfeit elements such as tobacco and other products are currently being sold throughout the world costing manufacturers and distributors considerable losses. If there were a simple and easy method for imparting a hidden hologram within the paper products used to contain and wrap these products, among many others, it would be a simple matter to trace down the counterfeiters. Thus, it is an object of this invention to impart hidden holograms in a cost-effective manner repetitively on to wrapping papers.

These and yet other objects are achieved in a holographic element comprising a paper support having two flat surfaces, one of said surfaces having in order:

a. an adhesive layer, and;

b. a metallized holographic image, wherein said metallized holographic image comprises at least two holograms therein, one of said holograms being visible only by non-coherent light and the other of said holograms being visible only by coherent light, and wherein a plurality of holographic images are formed on a photosensitive element on a polymeric support by at least two imaging steps and wherein said holographic images are then metallized and overcoated with an adhesive later, and whereby said metallized holographic image is subsequently transferred to said paper support from said polymeric support by laminating the adhesive layer coated over said metallized holographic image to said paper support at a temperature between 0° C. and 150° C. and a pressure greater than 1 pound per square inch and subsequently delaminating said polymeric support from said paper support substantially transferring all of the metallized portion of the holographic image to said paper support and leaving the holographic image on the polymeric support suitable for reuse.

In the process of this invention, a photosensitive polymeric support is prepared and at least two holographic images are placed thereon. The first holographic image is placed on the photosensitive polymeric support in a conventional manner, after masking over a portion of the photosensitive layer contained thereon. After removal of the photomask, a second holographic image is imparted in the unexposed areas of the photosensitive layer. Both holographic images are then metallized and subsequently transferred to a paper support, the holographic image having first been over-coated with an adhesive layer. Specific temperatures and pressures are required to transfer only the metallized portions of the holographic images, leaving the holographic images remaining on the polymeric support, after delamination. The holographic images may then be remetallized for reuse.

DETAILS OF THE INVENTION

Figure 1:
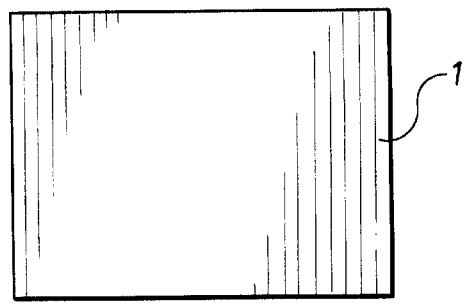
FIG. 1 is a top view of one of the flat surfaces of the paper support of this invention prior to laminating a metallized holographic image thereon.
Figure 2:
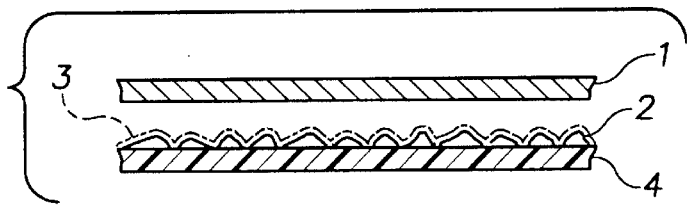
FIG. 2 is a side view of the paper support of FIG. 1 super-imposed over a polymeric support containing the metallized holographic image and prior to being laminated said paper support.
Figure 3:
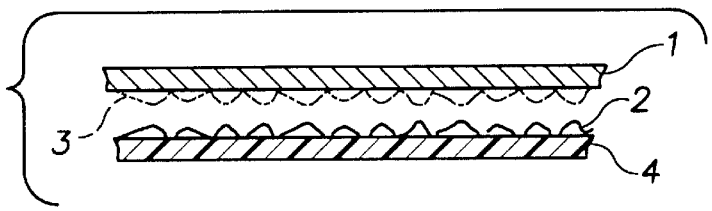
FIG. 3 is a side view of the paper support from FIGS. 1 and 2 after the metallized holographic image has been transferred from the polymeric support to the paper support. The holographic image itself is shown remaining on the polymeric support.

Referring now specifically to the drawings, which show some preferred modes of the element and process of this invention, FIG. 1 is a top view of one of the flat surfaces of the paper support of this invention shown as 1. Looking now at FIG. 2, 1 is again the paper support shown from the side and this element is juxtaposed against a polymeric support 4, which contains a series of holographic images 2 thereon. The holographic image has been metallized, which is shown as fine particles of metal 3. Moving on to FIG. 3, this view shows that the metallized image 3 has been transferred to the paper support 1 leaving the holographic images remaining on the polymeric support. This image can then be re-metallized and that metallized image transferred again to yet another paper support.

Figure 4:
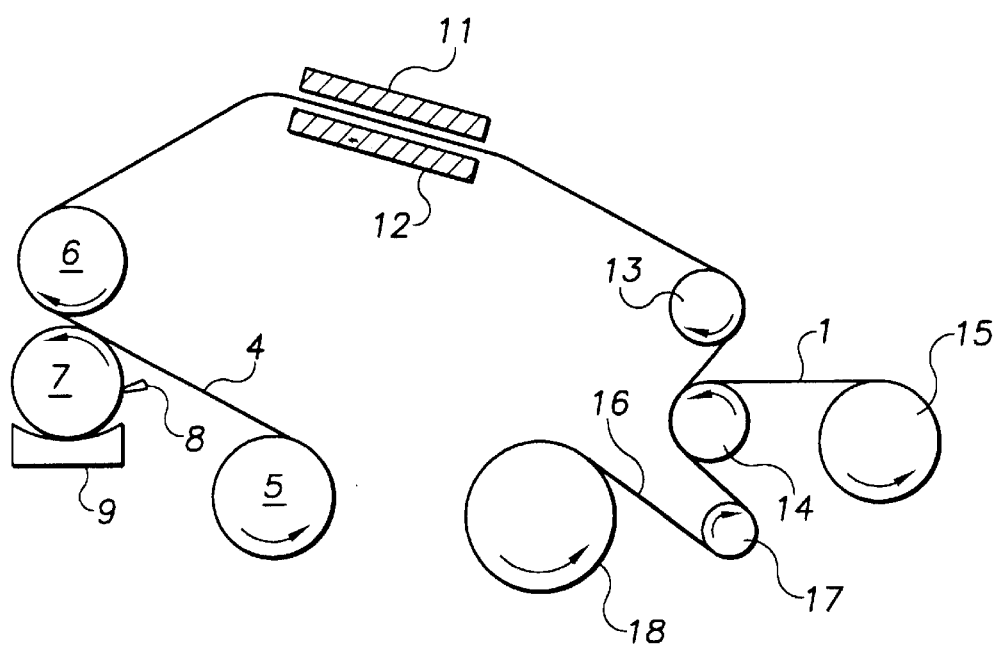
FIG. 4 is a drawing of the schematic process for the lamination of the metallized holographic image to the paper support.
Figure 5:
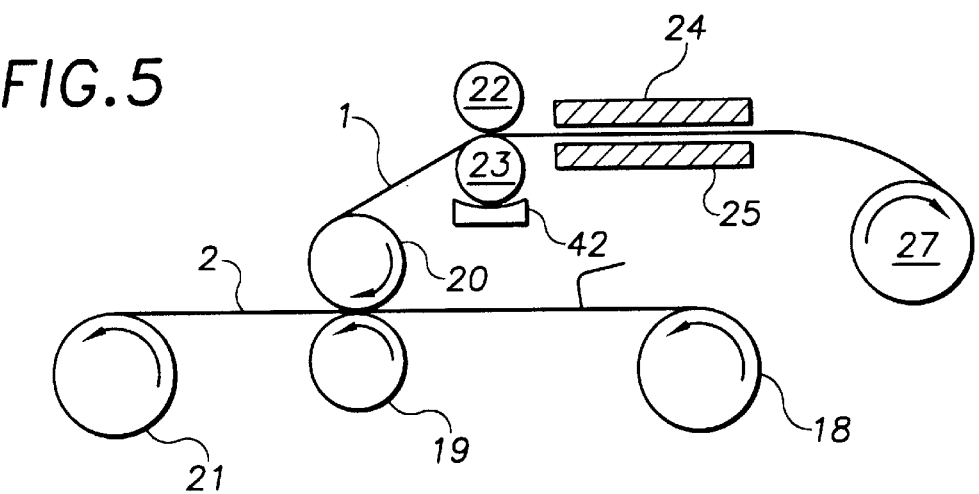
FIG. 5 is a drawing of the schematic process for the delamination of the polymeric substrate from the paper support to produce the metallized holographic image of FIG. 3 as shown.

FIG. 4 is a schematic showing of the process for the lamination of the metallized holographic image to the paper support. This, together with FIG. 5, represents the novel process of this invention. In FIG. 4 a polymeric support 4 containing metallized holographic images thereon (not shown here) is shown being pulled off an unwind roll 5 in a nip formed by opposing rollers 6 and 7. In this view, roll 7 is a standard gravure-coating roll, for example, and roll 6 is a typical backup roll. A reverse gravure doctor blade (to control coating weight) is shown as 8 and a coating pan (holding a standard adhesive solution) is shown as 9. The holographic images thus over-coated with an adhesive layer is then carried through a drier which is shown as 11 and 12 and subsequently down to heated rolls 13 and 14. In the nip formed by these last two rolls, a paper support 1 is taken from a roll 15 and this paper support contacts the dried surface of the adhesive layer of the polymeric support containing metallized holographic images thereunder. This step laminates the two supports (polymer 4 and paper 1) into a sandwich 16 which is passed over a chill roll 17 and then taken up on to a rewind roll 18.

The process of delamination is shown in FIG. 5. In this schematic drawing the laminated sandwich material 16 from FIG. 4 is drawn off unwind roll 18 and taken through the nip of two delamination rolls 19 and 20. The polymeric substrate 2 is taken up on a film rewind roll 21 (this material still contains holographic images thereon and may be remetallized and reused again). The paper support 1 now carrying the metallized holographic image (not shown in this figure) is taken up to coating heads 22 and 23. A protective coating may then be applied over the metallized, holographic image using this step. The protective coating may be applied at the nip of the coating heads 22 and 23 from a pan 42. The overcoated image may then be passed through dryers 24 and 25 and the hardened, protected holographic images on the paper support then wound up on roll 27. This roll of holographically imaged paper is now ready for use as a security wrap for a host of other materials.

Figure 6:
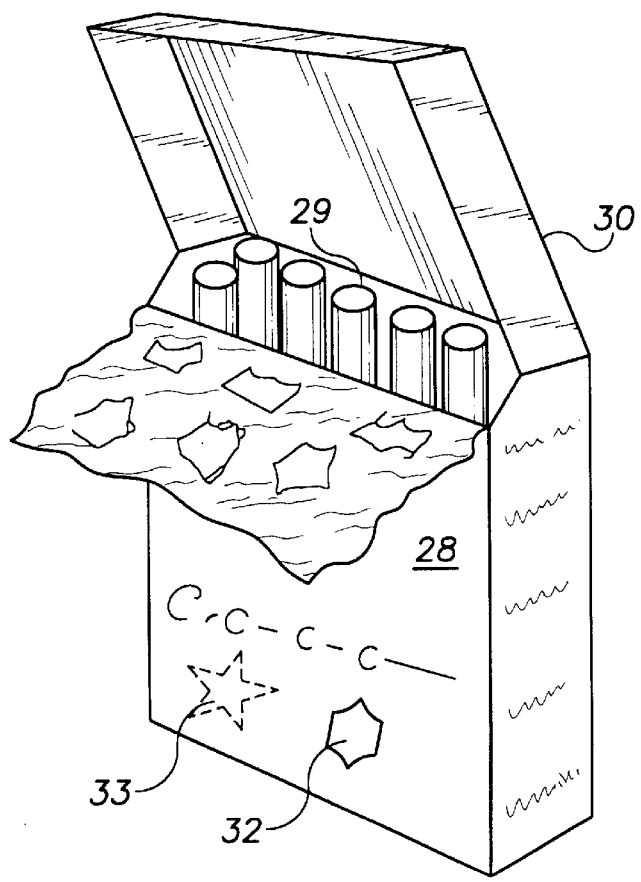
FIG. 6 is a drawing of an element wrapped by the paper support containing the holographic image. In this case, this is a cigarette pack the inside portion of which contains a typical paper support having the novel holographic image contained thereon. Two holographic images are imparted therein. One is visible, since it is under non-coherent (e.g. room) light. The second holographic image cannot be se in this figure.

A typical use for the paper containing holographic images as produced by this invention is shown in FIG. 6. In this particular figure, 28 is a typical cigarette box containing a plurality of cigarettes shown as 29, for example. The lid of the cigarette box 30 is shown open displaying the cigarettes contained therein. A paper 31, which may be wrapped around the cigarettes during manufacture, contains a plurality of holographic images 32, which can be viewed under white, visible light naturally. Hidden holographic images, also put on this paper support, are not visible under white light but may be viewed under coherent light (e.g. laser light). Thus, cigarettes made by the manufacturer may contain these hidden holographic images that may prevent counterfeiting thereof.

Figure 7:
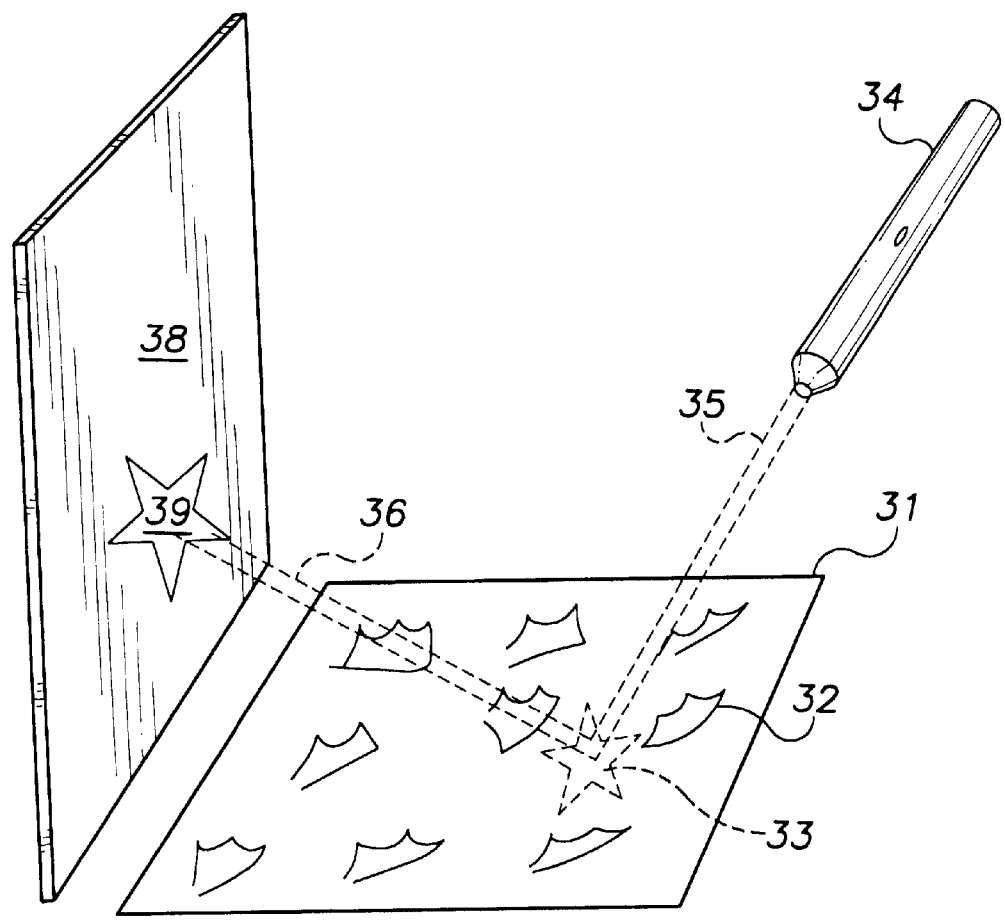
FIG. 7 shows a process by which coherent light may be shown onto the holographic images contained on the paper support from FIG. 5 illuminating the hidden holographic image reflected onto a white substrate at a ninety-degree angle thereto.

To observe the holograph contained hidden on the paper support of this invention, one needs to look at FIG. 7. In this figure, a paper support containing holographic images thereon is shown as 31 with the white light visible holographic images shown as 32. A hidden holographic image is shown with dashed lines as a star 33. A laser light from a hand held source 34 impinges its rays 35 on the hidden holographic image 33 and this light is reflected by rays 36 on to a white board or cardboard 38. The hidden holographic image can then be viewed as a full star 39 reflected onto this board.

The process of transferring the holographic images from the polymeric support to the paper support is carried out at temperatures of between 0° C. and 150° C. and a pressure of greater than 1 pound per square inch. I prefer temperatures between 30 to 125° C. and elevated pressures of between 5 to 10 pounds applied between the nip of rolls 6 and 7 shown in FIG. 4. The temperature should not be above 150° C. in order not to harm the holographic images contained on the polymeric roll. Thus, conditions in the driers should not exceed this temperature. Simply simply designing the length of the driers and the web speed of the element passing through these driers can control these temperatures. The purpose of the chill roll 17 is to set up the adhesive and insure that the paper support and the holographic images on the polymeric support 4 are secure. The adhesive material is well-known in the coating art and can be applied at a coating weight of between 0.5 to 14 pounds (dry) per ream of paper, wherein a ream is thought to be about 500 sheets of paper of 24 inches by 36 inches in size. The metallized holographic images can be transferred to either side of the paper support 1. The adhesive layer is applied over the metallized holographic images first. Then the paper support 1 contacts this layer at the head nip rolls and is adhered thereto.

When the two supports (polymeric 4 and paper 1) are delaminated following the process shown in FIG. 5, the metallized holographic images are transferred from the polymeric support 4 to the paper support 1. This step is accomplished by peeling apart the two supports. Since the adhesive layer will adhere more strongly to the paper support, it will pull along the metallized holographic images. These may then be over coated with a suitable protective layer; in fact it is so preferred. This protective layer may comprise an of a host of conventional materials such as solvent or water based acrylics, for example, and this layer may or may not be tinted if desired.

Paper support elements are also legion in number. For example, if one wishes to have a plurality of holographic images (some viewed only for security purposes) on wrapping paper, useful in a host of wrapping procedures, I will use that which is said to have 20 to 75 pounds per ream, where a ream is 500 sheets of paper 24 inches by 36 inches in size. This paper is particularly useful since it has such a low weight and thus can be used to wrap up any number of elements such as cigarettes and the like. Since some of the holographic images are hidden from normal view (e.g. under non-coherent white light, for example) these materials are very useful for security purposes since the so-called hidden holographic images can be viewed under coherent (e.g. laser) light and thus counterfeiting may be prevented. The papers containing the holographic images as described within this invention can be used in a host of applications including the wrapping of gifts; store wrappings; decorative wrappings; wrapping of food products for advertising and the like. The ability to have a secure, holographic image imparted thereon means the paper can be use exclusively for a certain application and thus has an improved quality of use.

Holographic images may be imparted onto a plurality of photosensitive layers such as silver halide, photoresists and the like, as is well-known to those skilled in the art and as is described in the prior art listed within this invention. These photosensitive layers can be applied on a plurality of polymeric supports including polyethylenes, polypropylenes, and polyethylene terephthalates among others. These substrates are usually 0.03 to 4.0 miles in thickness.

The ability to dry-bond laminate and then to delaminate the elements described in this invention, containing a plurality of metallized holographic images represents a unique process since it was not known before my invention that such holographic images could be so transferred. The process as described herein uses some unique equipment that is designed to hold, laminate and then delaminate some fairly flimsy material. It is necessary to insure that all of the elements of the process are carefully maintained within the processing limits. The use of the elements produced within the scope of this invention greatly increases the utility of holographic images to be commercially useful.

A preferred polymeric support is T-BOSS, which is available from Applied Extrusion Technologies, Inc. of Peabody, Mass.

I claim:
1. A holographic element comprising:
    a paper support having two flat surfaces, one of said surfaces having:
    an adhesive layer, and;
    a metallized holographic image wherein said metallized holographic image comprises at least two holograms therein, one of said holograms being visible by non-coherent light and the other of said holograms being visible by coherent light, and wherein said metallized holographic image is obtained from a plurality of holographic images formed on a photosensitive element coated on a polymeric support by masking part of said photosensitive element; forming a first holographic image viewable by non-coherent light on the un-masked part of said photosensitive element; removing said mask; forming a second holographic image viewable by coherent light on to the area of the photosensitive element that has been covered by said mask; and wherein said holographic images are then metallized and overcoated with an adhesive layer, and wherein said metallized holographic image is subsequently transferred to said paper support from said polymeric support by laminating the adhesive layer coated over said metallized holographic image to said paper support at a temperature of between 0 degrees C. and 150 degrees C. and a pressure of greater than 1 pound per square inch and subsequently delaminating said polymeric support from said paper support substantially transferring all of the metallized portion of the holographic image to said paper support and leaving the holographic image on the polymeric support suitable for reuse.

2. The holographic element of claim 1 where two holographic images are contained on said paper support and one of said holographic images can be viewed by coherent laser light reflected thereon.

3. The holographic element of claim 1 wherein said temperature of transfer is between 60 degrees C. and 90 degrees C. and said pressure is between 1 and 5 pounds per square inch.

4. The holographic element of claim 1 wherein said paper support has a weight of between 20 to 75 pounds per ream, wherein said ream is defined as 500 sheets of paper 24 by 36 inches in size.

5. The holographic element of claim 2, wherein one of said holographic images can be viewed by laser light reflected from said image on to a white surface held at right angles to said image.

6. The holographic element of claim 1 wherein said paper is used as a wrapping element and said holographic images are employed as security elements.

7. The holographic element of claim 1 wherein a protective layer is coated over the metallized holographic layer contained on said paper support.

8. A process for transferring a plurality of holograph images from a polymeric support to a paper support, comprising:
    coating a photosensitive layer on a polymeric support;
    masking part of said photosensitive layer;
    forming a first holographic image viewable by non-coherent light on the un-masked part of said photosensitive layer;
    removing said mask;
    forming a second holographic image viewable by coherent light on to the area of the photosensitive layer that has been covered by said mask;

metallizing a portion of said holographic images;

coating an adhesive layer on top of said metallized holographic images;

contacting said adhesive layer to a paper support at a temperature of between 0 degrees C. and 150 degrees C. and a pressure of greater than 1 pound per square inch to form a sandwich comprising the paper support, the adhesive layer, the metallized holographic layer and the polymeric support; and delaminating said sandwich whereby said metallized portion of said holographic image is transferred to said paper support and said holographic image remains on said polymeric support suitable for reuse.

9. The process of claim 8 wherein a protective layer is applied over said metallized holographic image on said paper support.

* * * * *